(12) United States Patent
Schemmann et al.

(10) Patent No.: US 9,134,813 B2
(45) Date of Patent: Sep. 15, 2015

(54) SYSTEM FOR DEMODULATING A SIGNAL

(75) Inventors: Marcel Schemmann, Maria Hoop (NL); Atanas Pentchev, Elst (NL); Carsten Heinks, Nordhorn (DE); Aalbert Stek, Emmen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 622 days.

(21) Appl. No.: 13/260,584

(22) PCT Filed: Mar. 24, 2010

(86) PCT No.: PCT/IB2010/051267
§ 371 (c)(1),
(2), (4) Date: Dec. 19, 2011

(87) PCT Pub. No.: WO2010/113074
PCT Pub. Date: Oct. 7, 2010

(65) Prior Publication Data
US 2012/0081693 A1    Apr. 5, 2012

(30) Foreign Application Priority Data

Mar. 31, 2009  (EP) .................................... 09156830

(51) Int. Cl.
*G01P 3/36* (2006.01)
*H03D 3/24* (2006.01)
*G06F 3/03* (2006.01)
*H04L 27/22* (2006.01)

(52) U.S. Cl.
CPC .............. *G06F 3/0317* (2013.01); *H04L 27/22* (2013.01)

(58) Field of Classification Search
CPC . H04L 27/223; H04L 27/0014; H04L 1/0054; H04L 2027/0016; H04L 2027/0046; H04L 25/03184; H04L 27/148; H03D 1/00; H03D 1/24; G01P 3/36
USPC ......................................................... 356/28.5
See application file for complete search history.

(56) References Cited

U.S. PATENT DOCUMENTS

| | | | |
|---|---|---|---|
| 5,983,082 A * | 11/1999 | Hilbert ............................. | 455/76 |
| 6,044,106 A * | 3/2000 | Suzuki ........................ | 375/219 |
| 6,181,258 B1 * | 1/2001 | Summers et al. ........ | 340/870.28 |
| 6,876,692 B2 * | 4/2005 | Shi et al. ........................ | 375/141 |
| 7,031,405 B1 * | 4/2006 | Touzni et al. ................. | 375/326 |
| 7,184,737 B2 * | 2/2007 | Liu ................................ | 455/302 |
| 7,339,683 B2 | 3/2008 | Wiejers et al. | |

(Continued)

FOREIGN PATENT DOCUMENTS

| | | |
|---|---|---|
| EP | 0970308 B1 | 1/2000 |
| WO | 2005106634 A1 | 11/2005 |
| WO | 2006106452 A1 | 10/2006 |

(Continued)

*Primary Examiner* — Luke Ratcliffe
*Assistant Examiner* — Vicente Rodriguez
(74) *Attorney, Agent, or Firm* — Yuliya Mathis

(57) ABSTRACT

A demodulating system (100) for demodulating a phase-modulated input signal (Si) comprises:
 a complex demodulator (110), having a first input (111) for receiving the phase-modulated input signal (Si) and being designed to perform complex multiplication of this signal with an approximation of the inverse of the phase modulation;
 a spectrum analyzing device (130) receiving the demodulated product signal produced by the complex demodulator (110) and capable of analyzing the frequency spectrum of the demodulated product signal.

12 Claims, 8 Drawing Sheets

(56) References Cited

U.S. PATENT DOCUMENTS

| | | |
|---|---|---|
| 2003/0185315 A1* | 10/2003 | Chen .................... 375/316 |
| 2006/0203937 A1 | 9/2006 | Burgio |
| 2007/0002013 A1 | 1/2007 | Kong et al. |
| 2007/0102523 A1 | 5/2007 | Kong |
| 2007/0177691 A1* | 8/2007 | Ruprich .................... 375/321 |

FOREIGN PATENT DOCUMENTS

| | | |
|---|---|---|
| WO | 2007026286 A2 | 3/2007 |
| WO | 2007072446 A2 | 6/2007 |

* cited by examiner

SYSTEM FOR DEMODULATING A SIGNAL

FIELD OF THE INVENTION

The present invention relates in general to a system for demodulating a phase-modulated or frequency-modulated signal.

BACKGROUND OF THE INVENTION

FIG. 1 schematically illustrates an optical computer mouse 1, comprising a laser device 2. The laser device is implemented as a semiconductor laser, as known per se. The mouse is moved over a surface 4, for instance a desktop. From a power source not shown for sake of simplicity, the laser device 2 receives an electric current, and as a result the laser 2 emits a laser beam 3 with a certain wavelength, which is reflected by the surface 4. Part of the laser light is reflected back towards the laser. It is possible to derive, from this reflected laser light, a signal representing velocity of the movement of the mouse 1 with respect to the surface.

FIG. 2 is a schematic diagram illustrating the measuring principle. The laser 2 comprises a semi-transparent front mirror 11 and a semi-transparent rear mirror 12, with a laser medium 13 (semiconductor body) between said two mirrors. It is noted that the mirrors 11, 12 are shown as two-dimensional structures, but in practice the mirrors 11, 12 will have a layered structure.

The laser light within the laser medium 13 is indicated as main laser light L0. Part of the laser light passes the front mirror 11 and forms the output beam 3; this light is also indicated L1. Likewise, part of the laser light passes the rear mirror 12 and forms a measuring beam 5; this light is also indicated L2.

The object 4 can be considered to constitute an external mirror with diffuse properties, and reflects the incoming beam L1: this is indicated as a reflected beam L3. In the drawing, the reflected beam L3 is shown as being a one-dimensional beam making an angle with the incoming beam L1, but in practice the reflected beam L3 will have a certain spatial distribution and a portion of this reflected beam L3 will be directed towards the front mirror 11. Thus, the object 4 can be considered as defining an external cavity together with the front mirror 11.

Under stationary conditions, the light L0 within the laser medium 13 forms a standing wave. Likewise, light L1 and L3 in the external cavity forms a standing wave which, through the front mirror 11, interferes with the light L0 within the laser medium 13. The measuring beam 5 has a constant intensity.

Assume that the object 4 is moving away from the laser 2. This means that the length of the interference cavity between the front mirror 11 and the object 4 is increasing, i.e. the number of standing waves fitting between the front mirror 11 and the object 4 is increasing. Consequently, the interference state at the location of the front mirror 11 changes from fully constructive to fully destructive and back. This has influence on the interference state in the laser medium 13, which in turn has influence on the intensity of light L5 of the measuring beam 5. As a result, this light L5 has intensity fluctuations at a frequency fD that is proportional to the velocity of movement of the object 4 with respect to the laser 2, i.e. the component thereof along the optical axis. It should be clear that the measuring beam 5 can be detected by an optical sensor, and that its output signal can be processed by a signal processor in order to process these intensity fluctuations and to calculate the object velocity therefrom. It is noted that said frequency fD is equal to the Doppler frequency.

It has already been proposed to solve this problem by supplying the laser with a triangularly modulated laser current, as illustrated in FIG. 3A. The laser current is varied in a linear manner between two extreme values I1 and I2 having the same sign. During one half of a current period, the laser current I is increasing from I1 to I2, the change rate R1=dI/dt being substantially constant. During another half of a current period, the laser current I is decreasing from I2 to I1, the change rate R2=dI/dt being substantially constant; typically, R2=−R1. Increasing/decreasing the laser current causes an increase/decrease of the laser temperature (as illustrated in FIG. 3B), which in turn causes an increase/decrease of the wavelength of the laser light (as illustrated in FIG. 3C) with a substantially constant change rate dλ/dt, in which λ indicates the laser wavelength. The result can be explained as follows. Assume that the object is moving away from the laser, so that the length of the interference cavity between the front mirror 11 and the object 4 is increasing. If the current magnitude and hence the laser wavelength is also increasing, the frequency of the intensity fluctuations of measuring light L5 is reduced; this is illustrated by a peak f1 in the frequency spectrum of FIG. 3D. The reduced frequency may even become equal to zero if D/λ remains constant, in which D indicates the distance between the front mirror 11 and the object 4. Conversely, if the laser wavelength is decreasing, the frequency of the intensity fluctuations of measuring light L5 is increased; this is illustrated by a peak f2 in the frequency spectrum of FIG. 3B. It is noted that the shift |fD−f1| is equal to the shift |fD−f2|. The spectrum of the intensity fluctuations of measuring light L5 thus shows two peaks f1 and f2, as schematically illustrated in FIG. 3B. If on the other hand the object is moving towards the laser, a frequency spectrum with two frequency peaks is again obtained, but now the lower frequency is obtained during the periods that the current magnitude is decreasing. Thus, the direction of movement can be determined by determining whether the frequency is higher during the periods that the current magnitude is decreasing or during the periods that the current magnitude is increasing. It should be clear that this information can be derived from the measuring signal relatively easily by a suitably programmed signal processor.

For a more detailed explanation, reference is made to U.S. Pat. No. 7,339,683, the contents of which is incorporated here by reference.

A problem in this respect is that the frequency needs to be determined during the periods that the current is increasing and during the periods that the current is decreasing, resulting in 2 discrete frequencies. Thus, measurements for measuring a first frequency always start at the beginnings of the periods that the current is increasing and they always end at the ends of these periods, while measurements for measuring a second frequency always start at the beginnings of the periods that the current is decreasing and they always end at the ends of these periods. Thus, these measurements are interrupted regularly, leading to interruptions in the data acquisition and a general loss of information. For a high accuracy sensor, however, it is desired to be able to (nearly) continuously track a displacement signal without these interruptions. For instance by tracking the phase of the displacement signal. Thus a method is needed that allows continuous tracking of a displacement signal while also providing direction detection.

BACKGROUND OF THE INVENTION

Stated more generally, a signal may contain multiple signal components, and the present invention aims to provide a signal processor capable of recognizing the exact frequency of a certain signal component in the received signal. Normally, a PLL (Phase Locked Loop) is used in a situation where the frequency of the frequency component is already known in approximation. For allowing the PLL to lock in on this frequency, it is known to start with the PLL having a relatively large bandwidth and then reducing the bandwidth while keeping the signal component within the band. However, there are cases where the received signal actually comprises multiple frequency components, of which the frequency distance may be relatively small, and of which the exact frequency is not approximately known in advance; the situation described in the introduction is an example of such case. If the conventional method of a PLL with an initially large bandwidth is used, chances are that the PLL will lock in on an incorrect frequency.

It is a particular object of the present invention to provide a device capable of reliably demodulating the received signal of such situation.

SUMMARY OF THE INVENTION

According to the present invention, a demodulating system for demodulating a phase-modulated signal comprises:
1) a digital demodulator comprising a digital FLL (Frequency Locked Loop), which contains a controllable reference frequency generator, the digital demodulator being capable of performing complex demodulation; and
2) a digital FFT device capable of performing a complex Fast Fourier Transformation (FFT);
3) a memory containing information defining an expected frequency characteristic of the phase-modulated signal;
4) an analyzing device.

The said information reflects the fact that the received phase-modulated signal is generated by a known process, and that the known process results in signals having a frequency characteristic that can be described by a predetermined formula. In the case of an optical displacement sensor as described above, the frequency characteristic can be described by a Bessel series.

The input signal of the demodulating system is subjected to complex demodulation by the digital demodulator. The demodulator output signal has a frequency spectrum that contains a primary peak and at least one but typically a plurality of secondary peaks. The primary peak has a frequency corresponding to the frequency which the demodulator has recognized as being the main signal component(s). It may however be that the demodulator has locked in on the wrong frequency, which means that the reference frequency generator is set to a wrong frequency.

The digital FFT device receives the said information from said memory, and thus, on the basis of the frequency characteristic to be expected, the digital FFT device performs complex Fast Fourier Transformation (FFT) on the demodulator output signal.

The output signal of the FFT device is provided to the analyzing device. The information contained in the output signal of the FFT device allows the analyzing device to determine whether or not the primary peak in the input signal of the FFT device is a correct peak in accordance with the expected frequency characteristic. If it is found that the primary peak is not correct, the information contained in the output signal of the FFT device also allows the analyzing device to determine the difference Δf between the current frequency of the said primary peak and the correct frequency. Based on this information, the analyzing device provides an error signal to the digital demodulator, which in response adapts the frequency of its reference frequency generator by the said difference Δf such as to be adjusted to the correct frequency.

Thus, very quickly, the digital demodulator locks in on the correct frequency. Now its output signal is also provided to a second analyzing device. The information contained in the output signal of the demodulator allows the second analyzing device to calculate velocity and direction of movement.
Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

In the following, an explanation will be given of demodulation of a phase modulated carrier to determine carrier frequency and carrier frequency sign. It will be shown that the signal frequency of a signal with a signal frequency and an approximately known phase modulation can be determined, including the sign of the frequency and with frequency values arbitrarily close to zero. This is accomplished by a complex demodulation of the signals with a phase that is opposite to the signal phase modulation. The Demodulation function or amplitude may be chosen specifically for certain signal frequency ranges. While there is tolerance to mismatch between modulation and demodulation phase functions, this mismatch should be limited such that in general the modulation function or amplitude may also be adapted for different signal frequency ranges. Signal frequency can be determined after the demodulation, for instance with a frequency locked loop (FLL) and/or with a CFFT. A CFFT is particularly useful to determine approximate signal frequency to support the locking process of an FLL and to determine if the modulation and demodulation phase amplitudes are matched.

Phase Modulated Signal

Assume a phase-modulated signal, consisting of a carrier signal having a carrier frequency ω of which the phase is modulated according to $$p(t)=P*\cos(\omega m*t)$$

where P is the modulation amplitude in radians, and wm is the modulation frequency.

Figure 1:
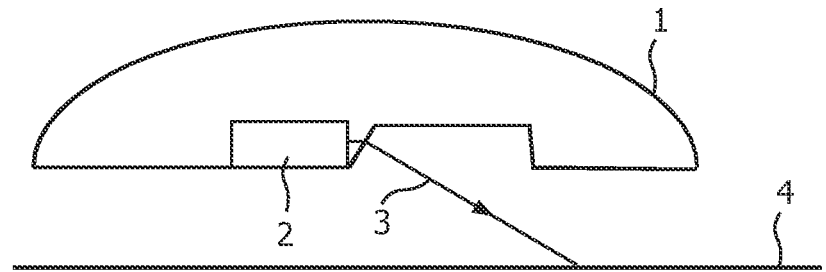
FIG. 1 schematically shows an optical computer mouse with a laser detector for detecting movement of the mouse with respect to a surface.
Figure 2:
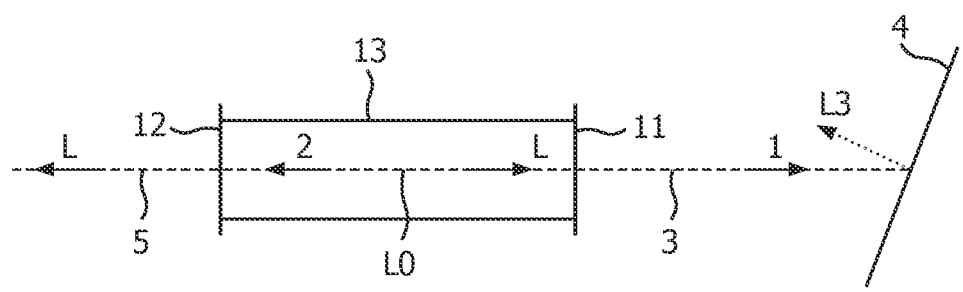
FIG. 2 is a diagram schematically illustrating the measuring principle underlying the laser movement detector.
Figure 3A:
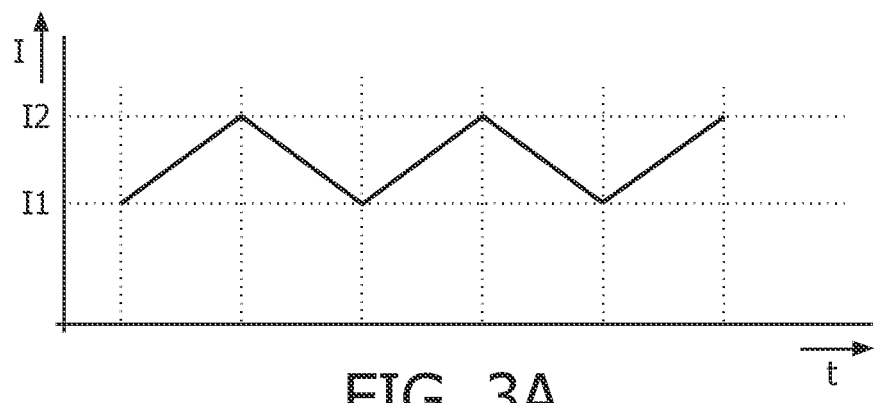
FIG. 3A schematically illustrates a triangularly modulated laser current.
Figure 3B:
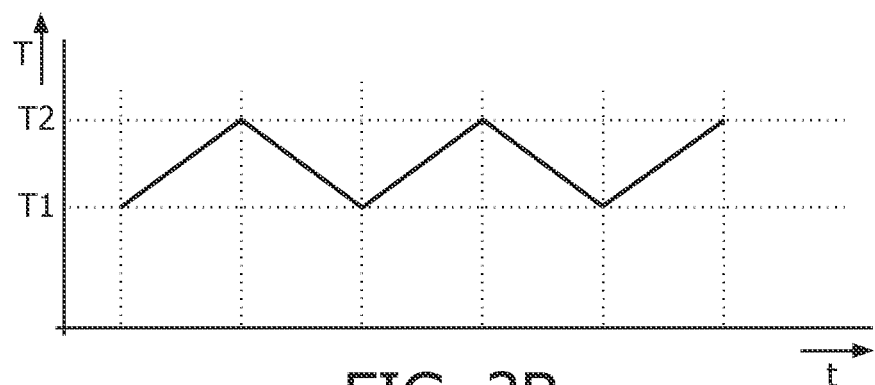
FIG. 3B schematically illustrates the laser temperature caused by the modulated laser current.
Figure 3C:
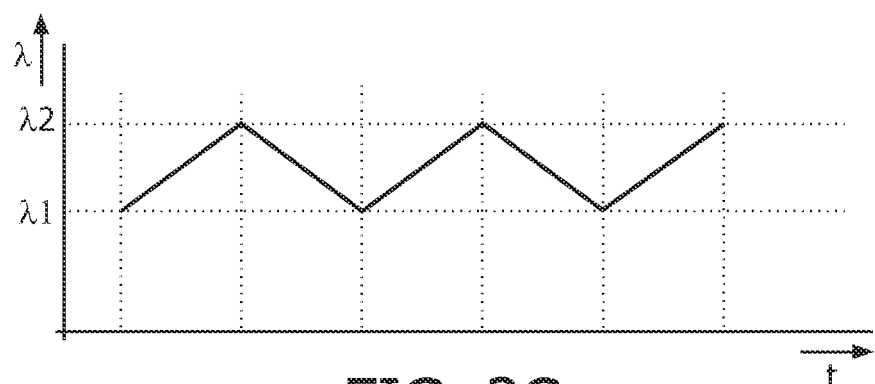
FIG. 3C schematically illustrates the laser wavelength resulting from the modulated laser temperature.
Figure 3D:
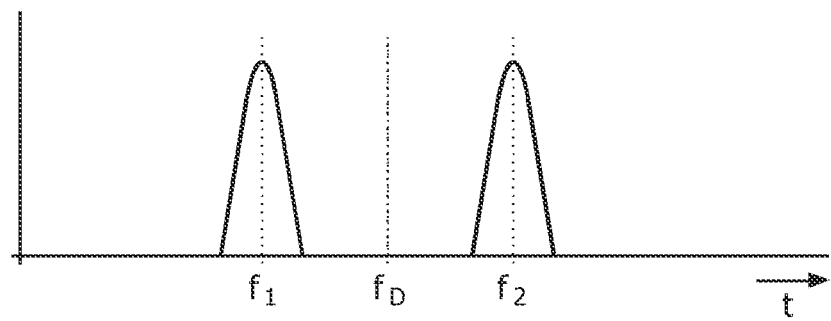
FIG. 3D schematically illustrates the frequency spectrum of the laser detector output signal in the case of a movement.
Figure 4:
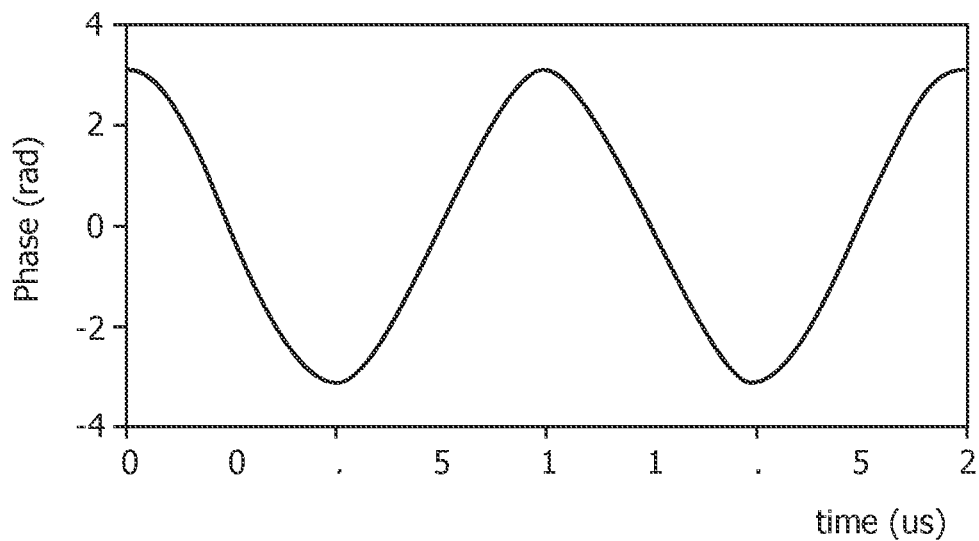
FIGS. 4 and 5 are graphs illustrating phase modulation.

FIG. 4 is a graph showing an example of such a phase modulation for large phase modulation, with P=π and fm=ωm/2π=1 MHz.

The resulting phase-modulated signal can be described by the formula:

$$f(t)=\cos(\omega^* t+p(t))$$

Figure 5:
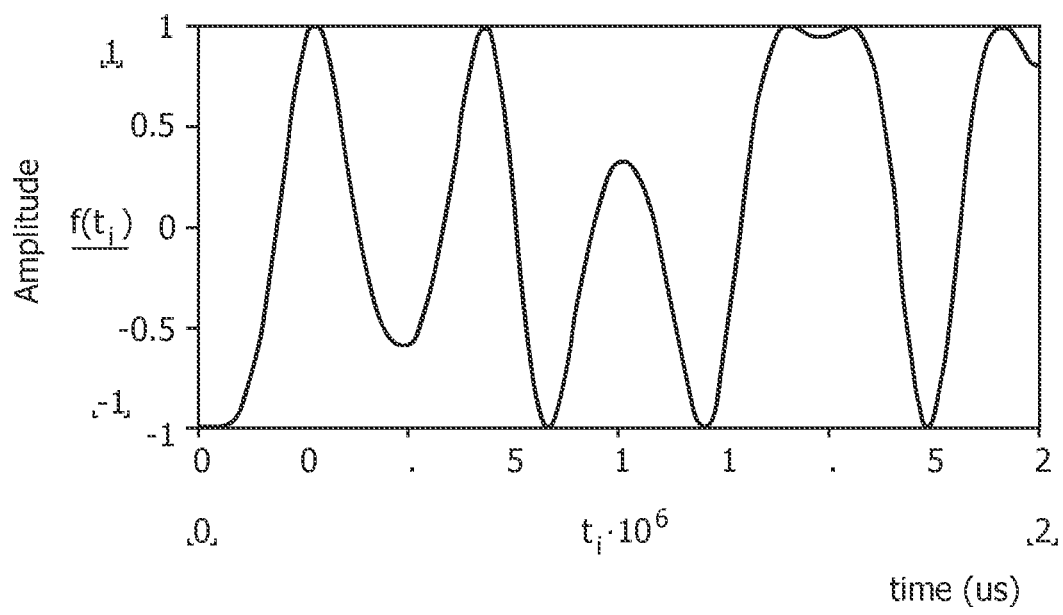

An example of this signal is shown in FIG. 5, with a carrier frequency f=ω/2π=300 kHz.

Figure 6:
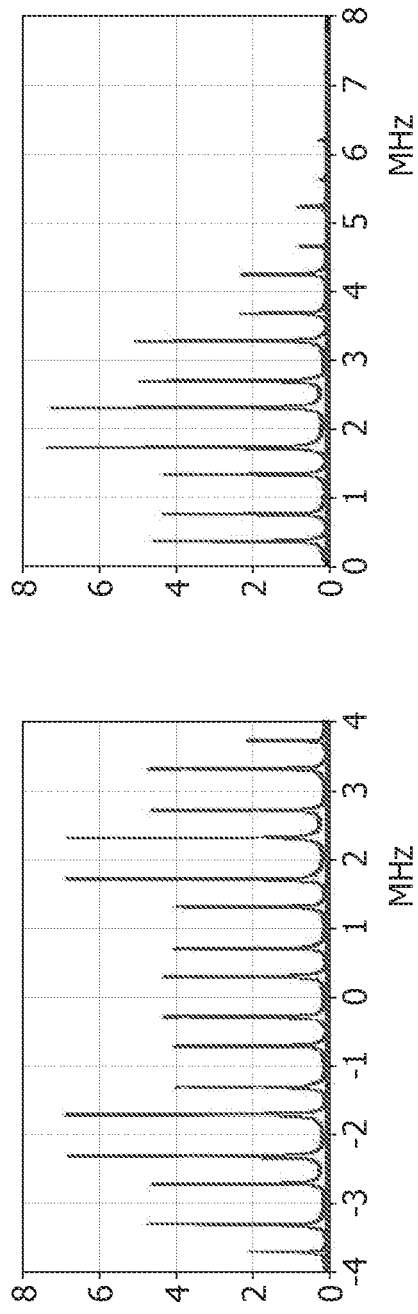
FIGS. 6-7 are graphs illustrating frequency spectra of a phase-modulated signal.

As is known from communication theory, such phase-modulated signal has a spectrum that is determined by a series of Bessel functions, and for the example given above the spectrum is shown in FIG. 6 as found from a complex Fourier transformation. The complex FFT spectrum is shown in the left-hand graph of FIG. 6, while the right-hand graph of FIG. 6 shows the FFT spectrum. Note that the complex FFT spectrum contains positive and negative frequencies; in the real domain, only positive frequencies can be measured, resulting in the spectrum shown to the right.

Figure 7:
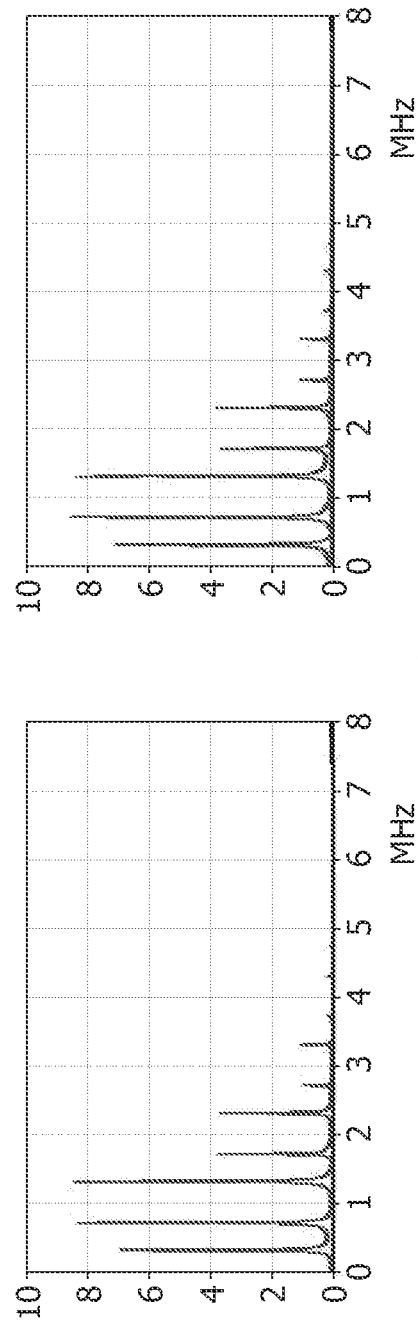

The height of the different peaks in the spectrum is determined by the phase modulation depth P. FIG. 7 shows the FFT spectrum for an example with P=0.5*π and ω=300 kHz (left) and ω=−300 kHz (right), respectively. It can be seen that these spectra yield no information about the sign of the frequency, which corresponds to the direction of movement of an object in the example discussed in the introduction. It is noted that this can also be recognized in the CFFT spectrum of FIG. 6, in that this spectrum is symmetrical with respect to zero. Furthermore, it can be seen that the strongest peaks may occur at frequencies different from the Doppler frequency of 300 kHz, recognizable as one of the smaller peaks.

Figure 8:
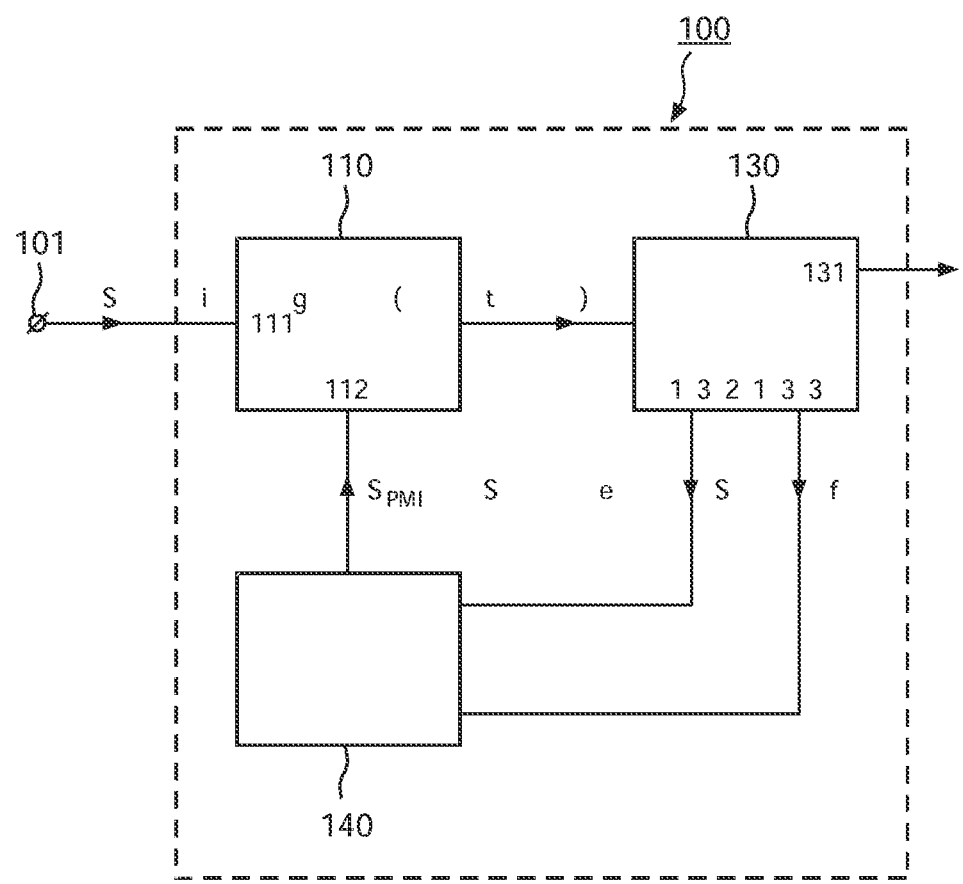
FIG. 8 is a block diagram illustrating a demodulating system according to the present invention.

The present invention aims to provide a demodulating system that is capable of receiving phase-modulated signals of the type as described above, having frequency spectra similar to the spectra as described above, and that is capable of performing such operation as to provide an output signal, also indicated as demodulated signal, of which the frequency spectrum has a clear signal at the carrier frequency and clearly distinguishes between positive and negative modulation frequency. A block diagram of such demodulating system 100 proposed by the present invention is shown in FIG. 8. The demodulating system 100 has an input 101 receiving the phase-modulated input signal Si.

Phase Demodulation

The demodulating system 100 comprises a complex demodulator 110, having a first input 111 and a second input 112. At its first input 111, the complex demodulator 110 receives the phase-modulated input signal Si. At its second input 112, the complex demodulator 110 receives a signal $S_{PMI}$ that contains information on the phase modulation of the input signal Si. The complex demodulator 110 is designed to use this information to perform a complex multiplication of the input signal Si with an approximation of the inverse of the phase modulation, according to the following formula:

$$g(t)=f(t)^*\exp(-i^*p(t)^*u)$$

where u is a factor equal to 1 or almost equal to 1.

For the example of f(t) given above, this results in:

$$g(t)=0.5^*\{\exp[i^*(\omega^* t+p(t))]+\exp[-i^*(\omega^* t+p(t))]\}^*\exp(-i^*p(t)^*u)$$

or $$g(t)=0.5^*\{\exp[i^*(\omega^* t+p(t)^*(1-u))]+\exp[-i^*(\omega^* t+p(t)^*(1+u))]\}$$

Figure 9:
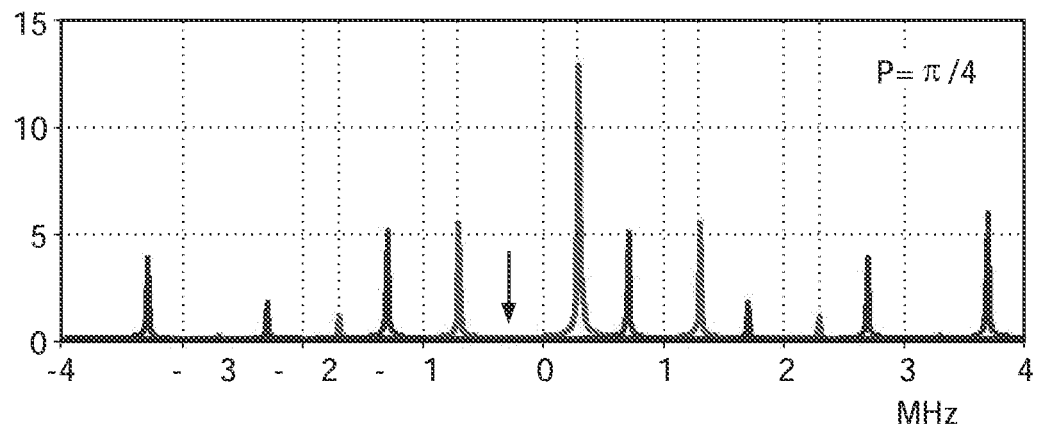
FIGS. 9-14 are graphs illustrating frequency spectra after demodulation according to the present invention.
Figure 9:
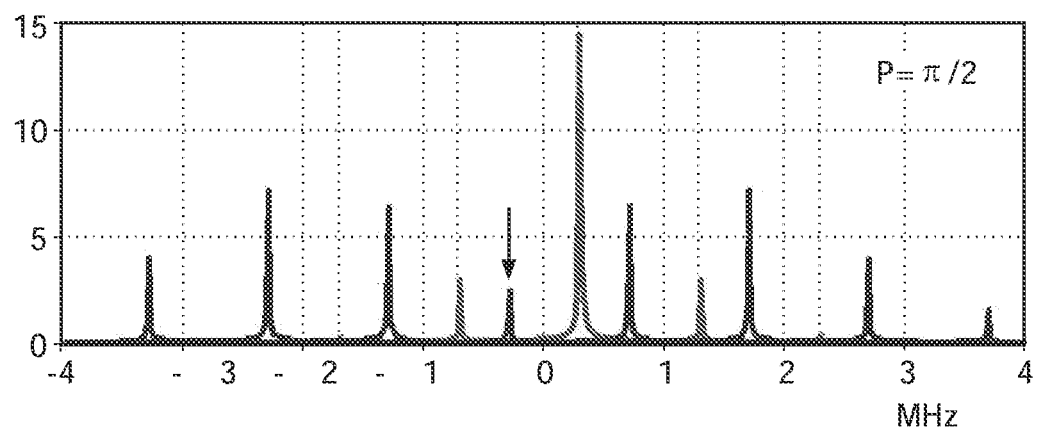
Figure 9:
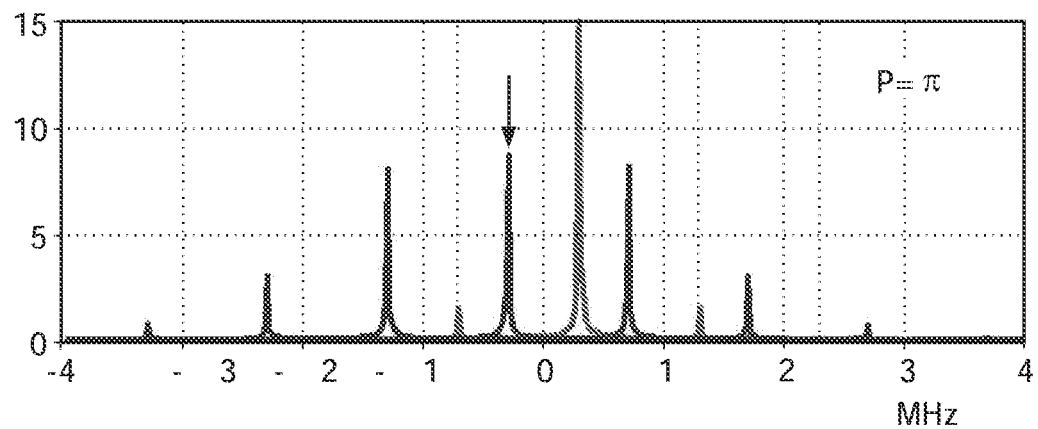

FIG. 9 shows the resulting spectra of g(t), for three different values of P, for an example where the carrier frequency is 300 kHz and u=0.75 (indicating 25% error in the estimate of u). The modulation frequency fm is 1 MHz. The sampling frequency is 16 MHz, so that the Fourier transformation provides output in the −8 to 8 MHz range, but the figure only shows the −4 to 4 MHz range.

It can clearly be seen that the strongest peak corresponds to the positive carrier frequency of 300 kHz; the vertical dotted lines indicate the peaks of the Bessel series frequencies belonging to this strongest peak. A vertical arrow indicates the frequency peak having the negative carrier frequency of −300 kHz; this frequency will be indicated as the opposite carrier frequency. The remaining (non-marked) peaks are the Bessel series frequencies around this opposite carrier frequency.

All the spectra are the result of complex Fourier transforms, as the input signal is a complex signal. The highest peak in the spectra corresponds to the Doppler frequency (carrier frequency of the phase-modulated input signal). There are side-peaks created by the residual phase modulation (1−u)*p(t), the relative level of these side-peaks to the main peak is determined by (1−u)*P. When u=1, the sidebands are absent. The sign of (1−u)*P determines the phase of the side-peaks. The spectrum can thus be used to determine and to control u and/or P. Opposite to the highest peak there is a second peak at the opposite (negative) frequency; this peak is weaker and has more side-peaks, due to the deeper phase modulation of this peak with phase amplitude (1+u)*P. By increasing P, the second peak can get completely suppressed and the spectrum is scattered over a wider range.

Figure 10:
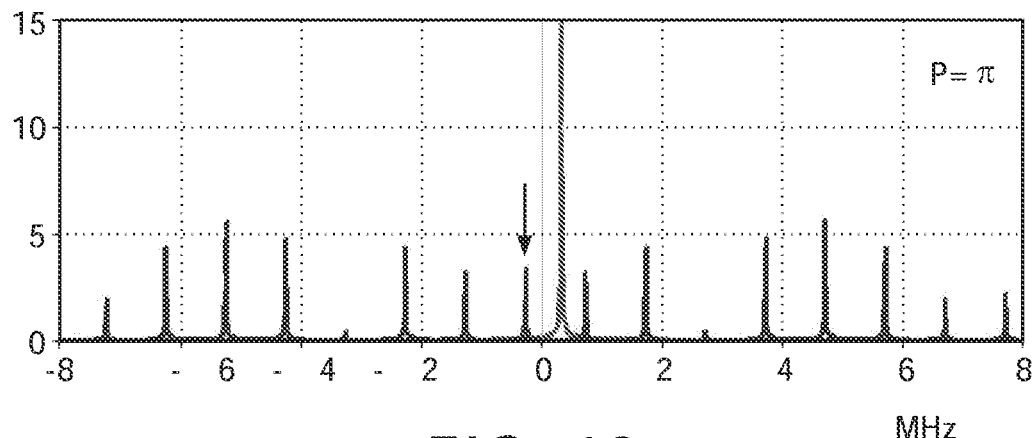

FIG. 10 shows the resulting spectra of g(t), for the same example but with u=1 (perfect demodulation) and P=π. The Doppler peak is strongest and does not cause any sidebands. The opposite Doppler peak is more than 10 dB weaker and has many sidebands scattered over a large frequency range. The spectrum around the opposite Doppler peak can thus also be used to determine the phase modulation depth.

Demodulation of Low Frequency Signals

Figure 11:
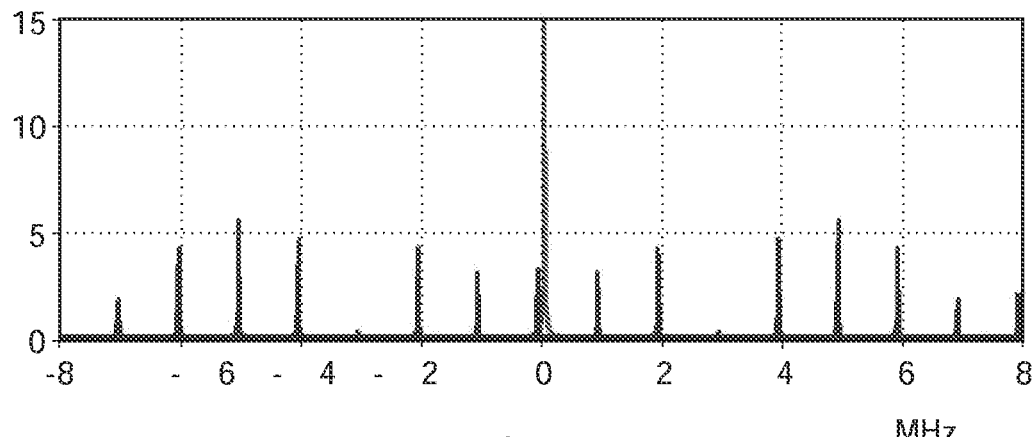
Figure 12:
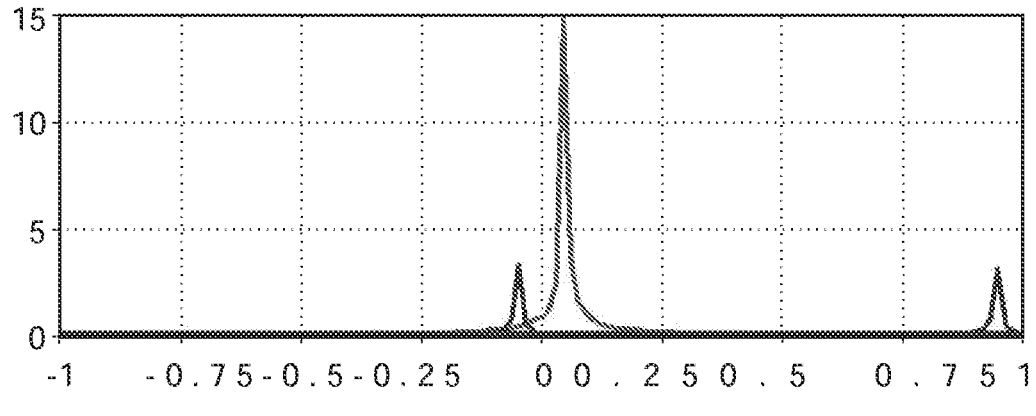

A special case occurs when the carrier frequency is near zero. In this case the carrier frequency and opposite carrier frequency practically overlap and so do their sidebands. However, the wide spectrum of the opposite frequency still allows an estimation of the modulation depth. FIG. 11 is a graph comparable to FIG. 10, for an example where the carrier frequency (Doppler frequency) is 50 kHz. For the same situation, FIG. 11 shows a zoomed-in version of this spectrum, for the range −1 to +1 MHz. While a CFFT with low resolution can only determine that the carrier frequency (i.e. speed) is low, a CFFT with sufficient resolution can still determine the sign of the frequency (i.e. direction of motion).

It has thus been shown that demodulation of a phase modulated signal by using a complex rotation with the inverse of the modulation phase, or an approximation thereof, allows both signal frequency and frequency sign to be determined In the case of a laser self-mixing sensor, this frequency will be the Doppler frequency. The phase modulation is allowed to be large, so large that the signal frequency cannot be determined anymore by looking at the signal spectrum prior to the complex demodulation. It is well known that the frequency sign cannot be determined from the spectrum of a real signal, but with the complex demodulation the resulting spectrum does allow determination of the frequency sign.

Thus, the demodulation device 100 comprises a spectrum analyzing device 130, receiving the output signal from the complex demodulator 110, and providing as output, at a first output 131, the main frequency of the demodulated signal (corresponding to the carrier frequency of the input signal Si) and the frequency sign. This spectrum analyzing device 130 may be implemented as a CFFT (Complex Fast Fourier Transform) device, but this is not the only tool applicable. A PLL or FLL is another option that may be used as an alternative or in parallel with a CFFT. A PLL or FLL has at the input a mixer (complex rotation) that multiplies the signal with the expected signal frequency (Doppler frequency in case of a self-mixing sensor). It is straightforward to include a multiplication with the opposite of that frequency at this stage. Both results can then be low pass filtered to remove frequencies far off the expected frequency (for instance +/−10 kHz in the figure above). The amplitudes of both signals can then be compared and since it is known that the main signal is much stronger than the unwanted inverse signal any lock to the weak unwanted signal can be detected immediately and prevented.

When the filter bandwidth is large enough to pass both peaks (that is when the expected Doppler frequency is under the filter bandwidth) then both peaks will be detected at each output (that is at the output with the positive Doppler demodulation frequency and at the output with the negative Doppler demodulation frequency). For a range of Doppler frequencies the amplitude difference between the filter outputs will still be sufficient to determine which sign is correct. For lower Doppler frequencies the outputs are indistinguishable and one of the outputs may be chosen, for instance the output with positive Doppler frequency demodulation. The phase of the complex signal at that output can then be tracked. This phase is added to the phase of the Doppler frequency demodulation to result in the total signal phase of the input signal. An error in choosing positive or negative Doppler frequency for demodulation output will be self-cancelled by this method so that for all signal frequencies from negative to positive the PLL or FLL can track phase accurately.

When the signal (Doppler frequency) is very high, the FLL could also erroneously lock to a side-peak. To prevent this, the use of a CFFT in parallel with the FLL is useful to determine the correct signal frequency and support the FLL to lock to the correct peak. In burst operation the CFFT is particularly useful to push the FLL demodulation frequency to the correct value when a good estimate of this demodulation frequency is not known prior to the burst.

The complex demodulation is tolerant to errors in the demodulation phase amplitude, but best results are obtained if the demodulation phase amplitude is close to the phase amplitude of the modulated signal. Therefore, the spectrum analyzing device 130 has a second output 132 providing an error signal Se that represents an estimate of the difference between actual phase amplitude of the modulated signal and demodulation phase amplitude. The error in the demodulation phase amplitude can be estimated from sideband phase and amplitude of the spectrum around the main frequency or from sideband phase and amplitude of a spectrum around an unwanted negative image of the main frequency. The amplitude of the unwanted inverted frequency peak relative to the main frequency peak may also be used to derive demodulation information. A modulation controller 140 receives the error signal Se and uses this signal to generate the phase modulation information signal $S_{PMI}$ for the complex demodulator 110.

It should be noted that, while the demodulation phase amplitude should more or less match the modulation phase amplitude, it is not necessary that this is achieved by controlling the demodulation phase amplitude. As an alternative, the modulation phase amplitude may be controlled. In a practical implementation, a sensor module may include the transmitting laser as well as the receiving sensor, and thus such module integrates both laser drive and signal analysis functions. Through the laser drive, the modulation phase amplitude can be controlled, in most cases by controlling the amplitude of an AC current superimposed on the laser bias current.

Figure 13:
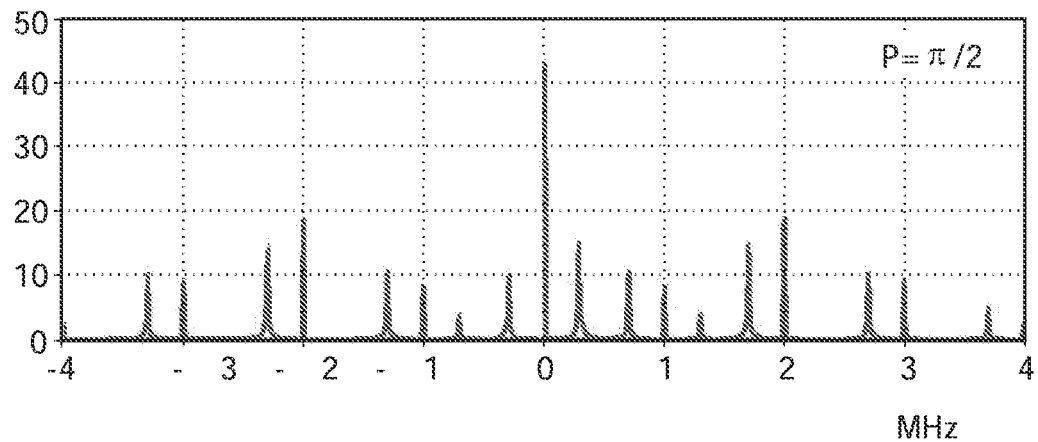

Thus, there will generally be a control loop such as:
Spectrum analysis=>demodulation amplitude=>spectrum=>spectrum analysis
Spectrum analysis=>modulation amplitude=>spectrum=>spectrum analysis Avoiding Lock to Unwanted Signal Components For an application in a self-mixing sensor, it should be noted that in reality, when a self-mixing laser sensor is phase modulated, there usually also is an amplitude modulated component in the laser light. This signal occurs at the phase modulation frequency. FIG. 13 shows the corresponding frequency spectrum for the example given (300 kHz signal frequency, 1 MHz modulation frequency, π/2 phase modulation and demodulation).

The spectrum shows strong unwanted peaks at 0 and at integer multiples of the modulation frequency of 1 MHz. The FLL could be affected detrimentally by the proximity of an unwanted peak due to the signal modulation. This can be mitigated by shifting the phase modulation frequency (and thus its spectrum) in dependence of the Doppler frequency such that the Doppler frequency is not close to an unwanted peak. When the sign of the signal frequency is known (such as for a sensor with an object moving at high speed) the modulation could also be turned off all together.

Thus, the spectrum analyzing device 130 may be designed to use the signal frequency to determine what phase modulation frequency is desirable to obtain a spectrum that is easy to analyze with a CFFT and to lock to for an FLL. The CFFT can also be used to determine the signal frequency range such that a suitable modulation frequency can be chosen. At a third output 133, the spectrum analyzing device 130 provides a signal Sf representing the desired phase modulation frequency, and this is also received by the modulation controller 140 and used to generate the phase modulation information signal $S_{PMI}$ for the complex demodulator 110. Thus, the phase modulation information signal $S_{PMI}$ may contain information for setting the phase modulation frequency and/or the phase modulation amplitude.

For very low speed, a residual amplitude modulation leads to a peak close to 0 Hz. This peak can be suppressed by choosing appropriate demodulation phase amplitude. For the example given (with u=1) with residual AM modulation for instance at 1.22π demodulation phase amplitude, the peak due to residual AM modulation can be extinguished. The proper phase demodulation amplitude for cancellation of residual AM modulation depends on system design. Furthermore, other measures are possible such as cancellation of residual AM modulation before the signal is demodulated. A combination of such measures can be used to remove the effect of residual AM modulation at low frequencies.

Figure 14:
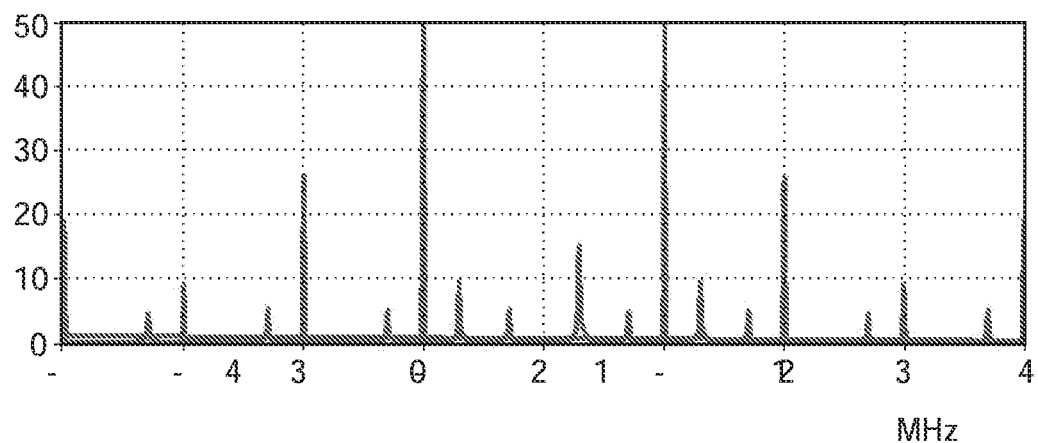

FIG. 14 is an example of a case where the demodulation phase amplitude and function would be chosen specifically to obtain good suppression of unwanted AM modulation in the input signal. Since the phase modulation and demodulation functions should match, this is an example of a case where the phase modulation would be controlled to obtain this match rather than the phase demodulation. It is also an example of a case where for low signal frequency (or low Doppler frequency in a self-mixing sensor) a particular phase modulation is chosen, and for higher speeds (for instance with signal around 1 MHz where the above spectrum shows strong unwanted peaks) another phase modulation and demodulation frequency and/or amplitude is preferred.

Summarizing, the present invention provides a demodulating system 100 for demodulating a phase-modulated input signal Si. The system comprises a complex demodulator 110, having a first input 111 for receiving the phase-modulated input signal Si and being designed to perform complex multiplication of this signal with an approximation of the inverse of the phase modulation; and a spectrum analyzing device 130 receiving the demodulated product signal produced by the complex demodulator 110 and capable of analyzing the frequency spectrum of the demodulated product signal.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, the modulation controller 140 may be integrated with the complex demodulator or the spectrum analyzing device.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A system for demodulating a phase-modulated input signal, the phase-modulated input signal comprising a carrier signal to which a phase modulation has been applied, the system comprising:
a complex demodulator having a first input for receiving the phase-modulated input signal and being configured to perform complex multiplication of the phase-modulated input signal with an approximation of an inverse of the phase modulation and in response thereto to output a demodulated product signal; and
a spectrum analyzing device receiving the demodulated product signal produced by the complex demodulator and capable of analyzing a frequency spectrum of the demodulated product signal.

2. The system of claim 1, wherein the spectrum analyzing device comprises a complex fast Fourier transform (CFFT) device.

3. The system of claim 1, wherein the spectrum analyzing device comprises a phase locked loop (PLL) device or a frequency locked loop (FLL) device.

4. The system of claim 1, wherein the spectrum analyzing device comprises a PLL device or a FLL device in parallel with a CFFT device.

5. The system of claim 1, wherein the spectrum analyzing device is capable of determining an estimate of the difference between a phase amplitude of the phase-modulated input signal and a phase amplitude of the demodulated product signal, and to provide an error signal that represents the estimate;
wherein the system for demodulating further comprises a modulation controller configured for receiving the error signal and generating a phase modulation information signal for the complex demodulator based on said error signal; and wherein the complex demodulator uses the phase modulation information signal to determine or adapt the approximation of the inverse of the phase modulation.

6. The system according to claim 5, wherein the demodulated product signal has a carrier frequency and wherein the error signal represents an estimate of sideband phase and amplitude of a spectrum around the carrier frequency.

7. The system according to claim 5, wherein the demodulated product signal has a carrier frequency and wherein the error signal represents an estimate of sideband phase and amplitude of a spectrum around an unwanted negative image of the carrier frequency.

8. The system of claim 7, wherein the spectrum analyzing device derives demodulation information from an amplitude of an unwanted inverted frequency peak relative to an amplitude of a peak of the carrier frequency peak.

9. The system according to claim 5, wherein the demodulated product signal has a carrier frequency and wherein the modulation controller shifts a phase modulation frequency in dependence of the carrier frequency in order to increase a distance between the carrier frequency and an unwanted frequency peak.

10. The system according to claim 5, wherein the demodulated product signal has a carrier frequency and wherein the spectrum analyzing device is configured to determine a phase modulation frequency based on the carrier frequency;
wherein the spectrum analyzing device is configured to provide an output signal representing the phase modulation frequency; and
wherein said output signal is also received by the modulation controller and used to generate the phase modulation information signal for the complex demodulator.

11. The system according to claim 5, wherein the demodulated product signal has a carrier frequency and wherein the modulation controller chooses the phase amplitude of the demodulated product signal for suppression of a peak close to 0 Hz.

12. The system according to claim 5, wherein the demodulated product signal has a carrier frequency and wherein the phase amplitude of the phase-modulated input signal and a phase-modulation function applied to the input signal are chosen to substantially suppress unwanted AM modulation in the input signal.

* * * * *